United States Patent
Ruland et al.

(10) Patent No.: US 11,724,327 B2
(45) Date of Patent: Aug. 15, 2023

(54) HANDLE FOR EXOTHERMIC MOLD WITH SPRING CONNECTORS

(71) Applicant: Hubbell Incorporated, Shelton, CT (US)

(72) Inventors: Rodd R. Ruland, Amherst, NH (US); Charles Mitchell Stilwell, Owasso, OK (US); David Lee Schroeder, Broken Arrow, OK (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/551,744

(22) Filed: Dec. 15, 2021

(65) Prior Publication Data

US 2022/0105584 A1 Apr. 7, 2022

Related U.S. Application Data

(63) Continuation of application No. 16/102,121, filed on Aug. 13, 2018, now Pat. No. 11,229,970.
(Continued)

(51) Int. Cl.
*B25B 5/16* (2006.01)
*B23K 3/08* (2006.01)
(Continued)

(52) U.S. Cl.
CPC .......... *B23K 3/087* (2013.01); *B22D 19/04* (2013.01); *B22D 33/00* (2013.01); *B23K 1/0006* (2013.01); *B23K 20/26* (2013.01); *B25B 5/16* (2013.01)

(58) Field of Classification Search
CPC .... B25B 7/04; B25B 7/22; B25B 5/16; B25B 5/163; F16B 21/18; Y10T 29/539
(Continued)

(56) References Cited

U.S. PATENT DOCUMENTS

D214,092 S 5/1969 Bogaerts
3,578,233 A 5/1971 Meister et al.
(Continued)

FOREIGN PATENT DOCUMENTS

DE 3206533 8/1983
EP 0870568 10/1998
EP 0870569 10/1998

OTHER PUBLICATIONS

Furseweld Grounding Catalog, Section G, © 2002 Thomas & Betts Corporation, printed from their website @ www.tnb.com, 68 pages.
(Continued)

*Primary Examiner* — Tyrone V Hall, Jr.
*Assistant Examiner* — Abbie E Quann
(74) *Attorney, Agent, or Firm* — Wissing Miller LLP

(57) ABSTRACT

Disclosed is a handle clamp for an exothermic mold. The clamp includes a pair of legs, each having a plurality of rods that are shaped to fit into engagement holes on sections of the mold. The rods of each leg engage with one section of the mold. Engagement brackets are rotatably disposed on one or more or the rods. The brackets each have a thumb bolt that can be extended toward a mold section connected with the clamp. When engaged with the mold section, the thumb bolt stabilizes the mold section on the handle. A detent mechanism is provided between the bracket and the leg of the handle. The detent mechanism releasably holds the bracket in one of a selected plurality of rotational positions with respect to the rod. By selecting different rotational positions for the brackets, the handle can be configured to engage with different configurations of mold. The thumb bolts that are biased toward the mold section by a spring. The bolts include a key that can be aligned or misaligned with a key slot on the bracket. By aligning the key with the key with the key slot, the bolt can be moved toward or away from the mold section under the biasing force of the spring.

(Continued)

By misaligning the key and key slot, the bolt can be locked into engagement with the mold section or else held in a disengaged position.

19 Claims, 12 Drawing Sheets

Related U.S. Application Data

(60) Provisional application No. 62/624,181, filed on Jan. 31, 2018, provisional application No. 62/548,004, filed on Aug. 21, 2017.

(51) Int. Cl.
| | | |
|---|---|---|
| *B22D 19/04* | (2006.01) | |
| *B23K 20/26* | (2006.01) | |
| *B23K 1/00* | (2006.01) | |
| *B22D 33/00* | (2006.01) | |

(58) Field of Classification Search
USPC .................................................. 269/47
See application file for complete search history.

(56) References Cited

U.S. PATENT DOCUMENTS

| | | | |
|---|---|---|---|
| 3,896,842 A | 7/1975 | Cole | |
| 3,922,008 A | 11/1975 | Stiner et al. | |
| 3,934,849 A | 1/1976 | Morain et al. | |
| 3,941,145 A | 3/1976 | Morain et al. | |
| 3,944,262 A | 3/1976 | Stiner et al. | |
| 4,053,134 A | 10/1977 | Peacock | |
| 4,094,536 A | 6/1978 | Cole et al. | |
| 4,099,670 A | 7/1978 | Cole et al. | |
| D249,889 S | 10/1978 | DeAmicis | |
| D265,055 S | 6/1982 | Bone | |
| D277,165 S | 1/1985 | DeVroom | |
| 4,492,005 A | 1/1985 | Begley et al. | |
| 4,889,180 A | 12/1989 | Sloan | |
| 4,889,324 A | 12/1989 | Brosnan et al. | |
| 4,905,725 A | 3/1990 | Sinkinson et al. | |
| 4,976,366 A | 12/1990 | Russell | |
| 5,061,165 A | 10/1991 | Guzikowski | |
| 5,209,018 A | 5/1993 | Heinrich | |
| D342,747 S | 12/1993 | Garcia | |
| 5,299,609 A | 4/1994 | Wedler | |
| D349,232 S | 8/1994 | Lebow | |
| D351,775 S | 10/1994 | Wedler | |
| 5,366,260 A | 11/1994 | Warluft | |
| 5,397,244 A | 3/1995 | Generoli et al. | |
| 5,431,068 A | 7/1995 | Alsch | |
| 5,524,940 A | 6/1996 | Warluft | |
| 5,533,662 A | 7/1996 | Stidham et al. | |
| 5,538,174 A | 7/1996 | Gaman | |
| D378,094 S | 2/1997 | Eberhard | |
| 5,653,279 A * | 8/1997 | Foutz | B23K 23/00 |
| | | | 228/234.3 |
| 5,660,317 A | 8/1997 | Singer et al. | |
| 5,692,785 A | 12/1997 | Warluft et al. | |
| 5,791,698 A | 8/1998 | Warluft et al. | |
| 5,829,510 A | 11/1998 | Fuchs | |
| 5,853,272 A | 12/1998 | Warluft et al. | |
| 5,954,261 A | 9/1999 | Gaman | |
| 5,975,587 A | 11/1999 | Wood et al. | |
| D427,890 S | 7/2000 | Griffin | |
| D442,454 S | 5/2001 | Kolpin | |
| 6,285,008 B1 | 9/2001 | Fleetwood et al. | |
| 6,286,542 B1 | 9/2001 | Morain et al. | |
| 6,382,496 B1 * | 5/2002 | Harger | B23K 23/00 |
| | | | 228/234.3 |
| 6,486,402 B2 | 11/2002 | Harger et al. | |
| D481,402 S | 10/2003 | Jenkins et al. | |
| 6,679,712 B2 | 1/2004 | Chang | |
| 6,746,055 B1 | 6/2004 | Wood et al. | |
| 6,776,386 B1 | 8/2004 | Morrissey et al. | |
| 6,786,691 B2 | 9/2004 | Alden, III | |
| 6,994,244 B2 | 2/2006 | Harger et al. | |
| D519,827 S | 5/2006 | Malzacher | |
| 7,240,717 B2 | 7/2007 | Lofton | |
| 7,294,913 B2 | 11/2007 | Fischer et al. | |
| D580,859 S | 11/2008 | Jones et al. | |
| D603,671 S | 11/2009 | Tippman, Sr. | |
| 7,946,466 B1 | 5/2011 | Lofton | |
| 7,950,568 B2 | 5/2011 | Stidham | |
| 7,975,900 B2 | 7/2011 | Lofton et al. | |
| 7,980,017 B2 | 7/2011 | Harman, III | |
| 7,997,166 B2 | 8/2011 | Lauzon | |
| 8,074,864 B2 | 12/2011 | Lofton et al. | |
| D666,976 S | 9/2012 | Lofton et al. | |
| D702,100 S | 4/2014 | Larard | |
| D775,917 S | 1/2017 | Wu | |
| D777,547 S | 1/2017 | Gassner | |
| D778,135 S | 2/2017 | Blank | |
| D783,377 S | 4/2017 | Gargano | |
| D805,366 S | 12/2017 | Gassner | |
| 2002/0114665 A1 * | 8/2002 | Quardt | H05K 5/0021 |
| | | | 403/348 |
| 2003/0070381 A1 | 4/2003 | Hawang | |
| 2005/0093412 A1 | 5/2005 | Lykowski et al. | |
| 2006/0237515 A1 * | 10/2006 | Ruland | B23K 37/0435 |
| | | | 228/44.3 |
| 2008/0216548 A1 | 9/2008 | Steiner | |
| 2010/0181710 A1 | 7/2010 | Martin | |
| 2015/0251264 A1 | 9/2015 | Hoagland | |
| 2016/0243676 A1 | 8/2016 | Grobbel | |
| 2017/0191669 A1 | 7/2017 | Oswald | |

OTHER PUBLICATIONS

International Search Report and Written Opinion mailed in PCT Application PCT/US18/46534 dated Dec. 11, 2018 (10 pages).

\* cited by examiner

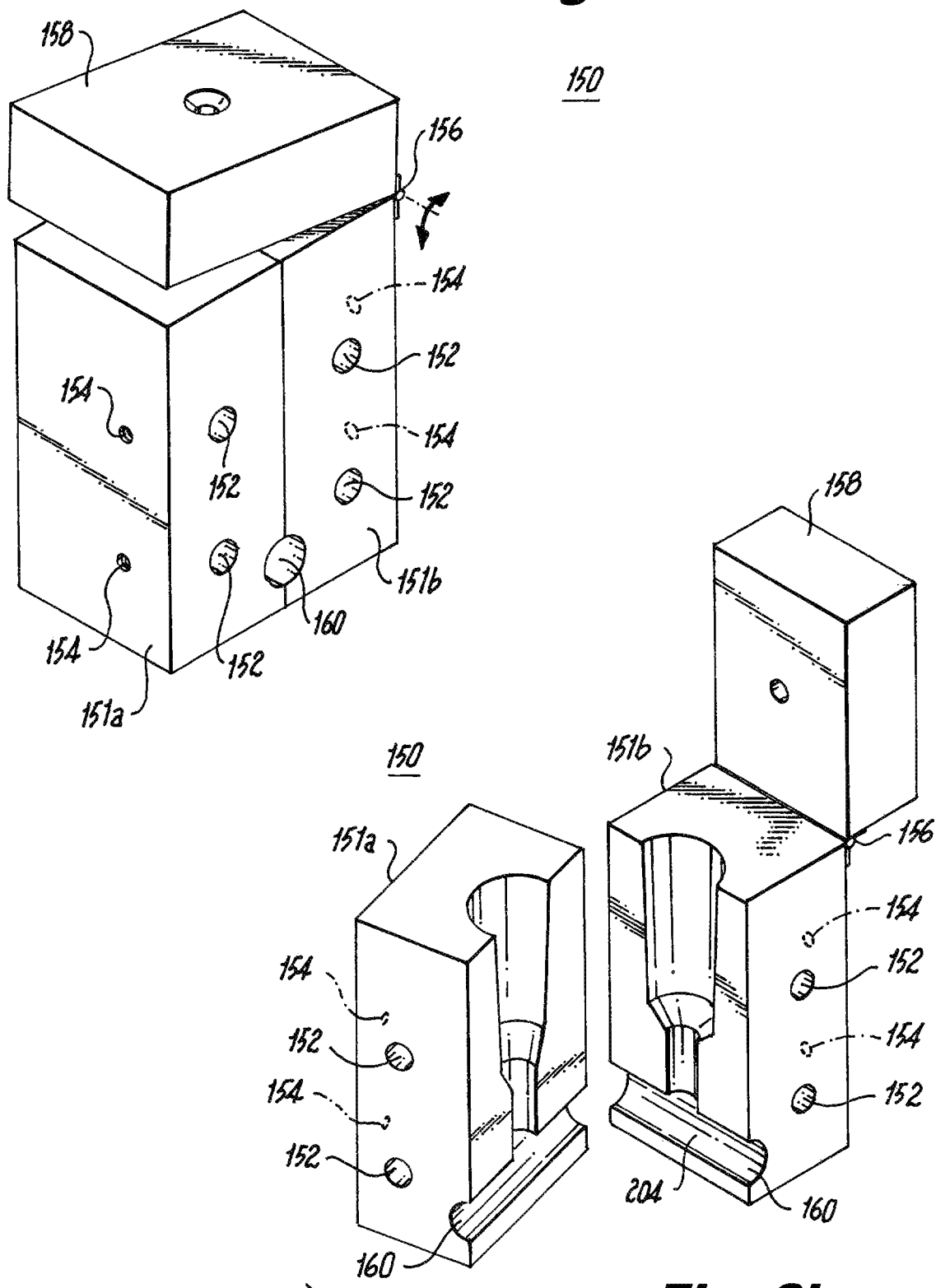

HANDLE FOR EXOTHERMIC MOLD WITH SPRING CONNECTORS

CROSS-REFERENCE TO RELATED APPLICATIONS

This application is a continuation of co-pending application Ser. No. 16/102,121, filed Aug. 13, 2018, which claims priority to U.S. Provisional Application Ser. No. 62/624,181 filed Jan. 31, 2018 and to U.S. Provisional Application Ser. No. 62/548,004 filed Aug. 21, 2017, the contents of each application are incorporated herein in their entirety by reference.

BACKGROUND

Field

The present disclosure relates to handles for assembling and positioning molds to create exothermic welds. In particular, the present disclosure describes a handle that is adjusted to engage with different configurations of exothermic mold components. The present disclosure further describes a handle that connects with mold components using spring-driven connectors

Description of the Related Art

Exothermic molding is a technique for joining metal objects, such as electrical conductors, using a highly exothermic chemical reaction. Welds created using this technique are mechanically strong and provide a secure, low resistance electrical connection between the objects. Such welds may be useful for lightning arrestors, grounding connections for electrical utility equipment, and the like.

Exothermic welding uses a powdered reaction mixture held in the reaction chamber of a mold. When the mixture is ignited it produces a molten metal. The molten metal flows from the reaction chamber into a mold cavity. Objects to be welded are positioned in the mold cavity. The molten metal wets the objects and fills the mold cavity. When the metal cools and solidifies the mold is removed, leaving the finished molded joint. Exothermic welding relies on a chemical reaction, for example, between copper oxide and powdered aluminum, that results in molten copper. Such reactions can reach temperatures in excess of 4000° F. Molds are typically made of refractory materials, such as ceramic or graphite, that can withstand these temperatures.

Molds are shaped to allow conductors with varying sizes, shapes, and configurations to be positioned in the mold cavity. Once the conductors are welded together, the mold needs to be removed from around the newly created joint. The configuration of conductors may be such that portions of the mold need to be separated from one another to release the conductors and welded joint from the mold.

One way to provide a mold that can be removed from welded conductors is to use a single shot mold. A single shot mold is formed from a heat-resistant ceramic body with a reaction chamber that holds the reactant mixture and is positioned above a mold cavity that is shaped to form a welded joint. The mixture is ignited and the resultant liquid metal flows into a cavity surrounding the conductors to create the joint. The ceramic mold is then broken away, releasing the welded conductors. Because the single shot molds are broken away once the weld is complete, they can be formed from a single piece of material and do not require separable sections to release the welded conductors. Single shot molds may be relatively expensive to use since a new mold is required each time a weld is made.

SUMMARY

The present disclosure relates to apparatuses and methods to address these difficulties.

An alternative to using single shot molds is to use a reusable mold. A reusable mold is formed from separable sections that have faces shaped to form a mold cavity and to hold the conductors in the proper configuration to form the welded joint. The mold sections are clamped together to form a mold cavity around the conductors. A reactant chamber above the mold cavity is filled with the reactant mixture and ignited, delivering molten metal to the mold cavity to create the weld. When the weld is complete, the mold sections are separated, allowing the mold sections to be removed intact from the welded conductors and reused.

To hold faces of the mold sections together and to position the mold with respect to conductors, a handle clamp is used. The handle clamp has rods that fit into holes in the mold sections to apply force to close and open the mold. The handle clamp has a locking mechanism to hold the mold closed while the weld is created. The handle clamp has mounting brackets fitted to the rods to secure the mold sections onto the rods. The mounting brackets each include a thumb bolt that is threaded through the bracket. To secure a mold section to the handle clamp, the installer fits the mold section over the rods and tightens the thumb bolts to engage with stabilizer holes on the mold section.

Molds may be designed with mold sections that separate from one another along a plane, for example, along a horizontal or vertical plane. The handle clamp is adjusted to accommodate different mold designs by rotating the mounting brackets about the rods so that the thumb bolts engage with the correct surface of the mold sections and so that the brackets do not interfere with the insertion of the rods into the mold sections.

Adjusting a handle clamp and connecting it with different configurations of mold may be cumbersome, particularly when the mold is used to create multiple welds and may be hot as a result of a previous molding operation. Because mounting bracket can rotate with respect to the rods, the brackets may inadvertently interfere with insertion of the rods into the mold sections. The installer may have to hold the brackets in place while at the same time inserting the rods into the mold sections to assure that the rods are fully inserted into the mold sections. In addition, to make sure the thumb bolts properly engage with stabilizer holes on the mold, the installer must hold the brackets in the correct position while turning the thumb bolts.

One aspect of the disclosure describes a handle clamp for an exothermic mold that includes mounting brackets that can be removably fixed into selected orientations. This allows the installer to set the configuration of the handle to accommodate a selected type of mold so that the rods can be fully inserted into the mold without having to manually hold the brackets in place. This also simplifies the task of tightening the thumb bolts to engage with mold sections because the selected positions of the brackets assure proper alignment of the thumb bolts with stabilizer holes.

According to another aspect of the disclosure, brackets are provided with a detent mechanism that fixes the bracket in either a parallel or perpendicular orientation with respect to the handle. The bracket has a plurality of holes on the surface facing the handle. The handle has a post or convex portion extending toward the bracket. The locations of the holes on the bracket are selected so that engagement of a selected hole with the post fixes the bracket into one of a plurality of the desired angular positions about the rod. A spring presses the bracket toward the surface of the handle, keeping the hole and post engaged with one another and holding the bracket in the selected angular position. Before connecting a selected exothermic mold with the handle, an installer puts the brackets in the proper positions to hold the sections of the selected mold. The rods are inserted into corresponding holes on the mold. When the rods are fully inserted into the mold, the brackets align with stabilizer holes on the mold. The installer fixes the mold to the handle by tightening the thumb bolts to engage the stabilizer holes.

When another configuration of mold is required, the installer adjusts one or more of the brackets so that a different hole on the bracket engages with the post on the handle clamp. The detent arrangement holds the bracket in the newly selected position while the installer fits the new mold sections over the rods and tightens the thumb bolts to fix the handle clamp with the new mold.

According to a further aspect of the disclosure, instead of thumb bolts, a handle clamp is disclosed that includes spring-driven bolts that engage with stabilizer holes on the mold sections. One or more brackets include a hole through which the bolt is inserted. A retaining ring is affixed to the bolt and a coil spring is disposed between the retaining ring and a distal surface of the bracket. The spring provides a biasing force that drives the bolt toward a mold section fitted to the handle. The distal end of the bolt engages a stabilizer hole on the mold section preventing the mold section from disengaging from the handle.

The bolt includes one or more protrusions or keys extending radially outward from the surface of the bolt. The hole in the bracket includes a slot through which the protrusion or key can fit, provided the bolt is angularly oriented so the protrusion or key is aligned with the slot. To disengage a mold section from the handle, an installer rotates the bolt until the protrusion or key aligns with the slot and pulls the bolt in the proximal direction until the protrusion or key is proximal of the bracket. The installer rotates the bolt so the protrusion or key is no longer aligned with the slot and releases the bolt, which moves distally under the bias force exerted by the spring. This brings the protrusion or key in contact with the proximal surface of the bracket, securely holding the distal tip of the bolt away from the mold section so that it does not interfere with the installation of a new mold section. To engage a new mold section with the handle, the installer rotates the bolt so that the key or protrusion aligns with the slot, allowing the bolt to move toward the mold section under the biasing force of the spring. The tip of the bolt engages with the corresponding stabilizer hole on the mold section. The installer then rotates the bolt so that the key or protrusion no longer aligns with the slot and the proximal end of the key or protrusion contacts the distal surface of the bracket, preventing the bolt from moving away from the mold section and assuring that the engagement of the bolt in the mounting hole is secure.

According to a further aspect of the disclosure there is provided a handle clamp for an exothermic mold comprising a pair of grips, a pair of legs connected with respective ones of the grips, the legs arranged to move toward and away from one another in response to motion of the grips. a plurality of engagement rods disposed on each of the legs, wherein the engagement rods on each leg are adapted to engage with respective sections of an exothermic mold, one or more brackets, each bracket rotatably disposed on one of the rods, and a detent mechanism to releasably hold the bracket in a selected angular position with respect to the rod.

According to a further aspect of the disclosure the detent mechanism comprises a convex feature and a plurality of concave features arranged radially about the engagement rod, the convex feature disposed on the leg or the bracket and the concave features disposed on the other of the leg or the bracket, the concave and convex features shaped to engage with one another and positioned so that when a selected one of the concave features is engaged with the convex feature, the bracket is positioned in a respective one of a plurality of angular positions about the rod. The detent mechanism further comprises a force applying member adapted to apply a force to hold the engaged convex and concave features against one another. The force applying member is one of a coil spring, a spring washer, an elastomeric washer, and a magnetic insert.

According to a further aspect of the disclosure the concave feature is a hole or dimple on the leg or bracket. According to a further aspect of the disclosure the convex feature is a pin extending from one of the leg or bracket and the concave feature is a hole in the other of the leg or bracket.

According to a further aspect of the disclosure the handle clamp further comprises a locking mechanism, the locking mechanism releasably locking the grips in a closed position.

According to a further aspect of the disclosure the handle clamp further comprises a bolt hole through the bracket and a bolt disposed in the bolt hole and movable toward and away from a surface of the mold and wherein the bolt and the bolt hole are in threaded engagement with one another. The bolt hole further comprises a key slot, wherein the bolt further comprises a key, wherein the bolt is rotatable in the hole and wherein, when the key is aligned with the key slot, the bolt can slide through the bolt hole. According to a further aspect of the disclosure a proximal end of the key engages a distal surface of the bracket when a tip of the bolt engages with the mold section. The bolt comprises a bolt-driving spring arranged to bias the bolt in a direction toward or away from the mold, wherein the bolt further comprises a spring retaining feature, and wherein the coils spring is disposed between a surface of the bracket and the spring retaining feature.

According to a further aspect of the disclosure the bolt further comprises a threaded portion adapted for threaded engagement with a threaded hole of the mold section. According to a further aspect of the disclosure the threaded portion of the bolt is provided only on a proximal portion of the bolt.

According to a further aspect of the disclosure there is provided a method for forming a weld comprising the steps of: providing an exothermic mold formed from a plurality of mold sections wherein the mold sections comprise rod engaging holes, stabilizer holes, and a mold cavity; providing a handle clamp, the handle clamp comprising: a pair of grips, a pair of legs connected with respective ones of the grips, the legs arranged to move toward and away from one another in response to motion of the grips, a plurality of engagement rods disposed on each of the legs, wherein the engagement rods on each leg are adapted to be inserted into engaging holes of respective sections of the mold, one or more brackets rotatably disposed on respective ones of the rods, wherein the bracket comprises a bolt hole, a bolt movably disposed in the bolt hole, and a detent mechanism to releasably hold the bracket in a selected angular position with respect to the rod; positioning the bracket in the selected angular position; engaging the detent mechanism to hold the bracket in the selected angular position; fitting the engagement rods into the rod engagement holes of the mold sections; extending the bolt through the bolt hole toward the mold section; engaging a tip of the bolt with a respective stabilizer hole of the mold section; positioning the mold sections adjacent a structure to be welded; squeezing the grips to press the mold sections together; activating an exothermic reaction in the mold to form the weld in the mold cavity; separating the grips to separate the mold sections; and removing the weld from the mold cavity.

According to a further aspect of the disclosure the bolt and bolt hole comprise mutually engaged threads and the step of extending comprises rotating the bolt.

According to a further aspect of the disclosure the handle clamp further comprises a spring connected with the bolt and the step of extending comprises biasing the bolt into engagement with the mold section with a biasing force applied by the spring. The bolt further comprises a key, the bolt hole further comprises a key slot, and the step of moving further comprises rotating the bolt to align the key with the key slot to allow the bolt to move through the bolt hole. After the tip is engaged with the stabilizer hole, the step of extending comprises rotating the bolt to misalign the key and the key slot to prevent the bolt tip from moving away from the stabilizer hole.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1b shows an exploded view of the embodiment of FIG. 1a;

FIG. 3a shows a perspective view of the mold in a closed configuration according to the embodiment of FIG. 2a;

FIG. 3b shows a perspective view of the mold in an open configuration according to the embodiment of FIG. 2a;

FIG. 4 shows a partial cutaway view of the mold according to the embodiment of FIG. 2a;

FIG. 5b shows a perspective view of the mold according to the embodiment of FIG. 5a;

FIG. 5c shows a partial cutaway view of the mold according to the embodiment of FIG. 5a;

FIG. 6b shows an exploded view of the embodiment of FIG. 6a;

DETAILED DESCRIPTION

Figure 1A:
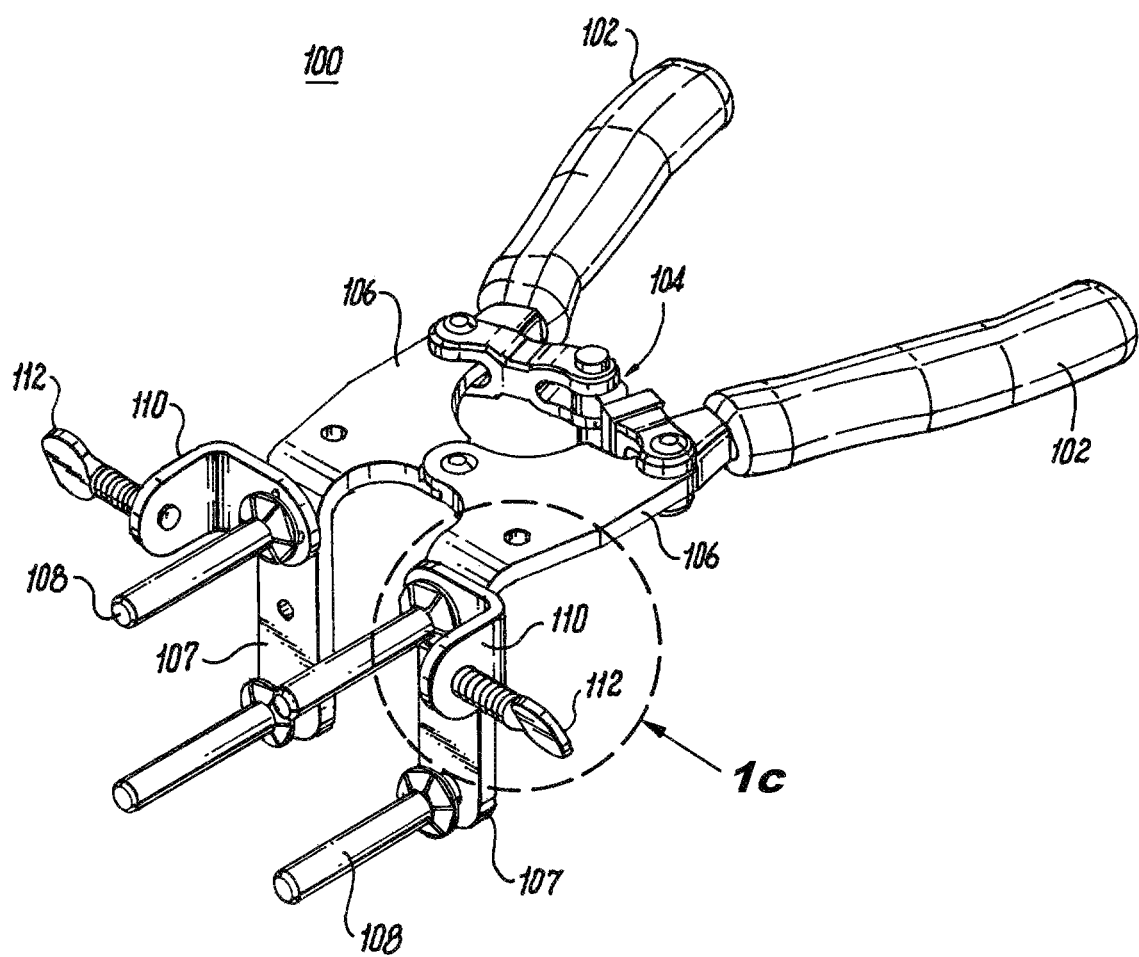
FIG. 1a shows a handle clamp for an exothermic mold according to an embodiment of the disclosure.

FIG. 1a shows a handle for an exothermic welding mold 100. The handle 100 includes insulated grips 102 connected with clamping arms 106. A locking mechanism 104 is provided between the grips 102. As will be described below, when the grips are squeezed together, arms 106 exert a closing force on mold sections closing the mold cavity around conductors or other objects that are to be welded together. The locking mechanism 104 holds the handle in a clamped configuration. To open the mold, an installer disengages the locking mechanism 104 and pulls apart the grips away from one another, separating the arms 106 and opening the mold cavity.

Arms 106 bend 90 degrees to form legs 107. Rods 108 extent away from the surface of legs 107. Brackets 110 are disposed on two of the rods 108. Brackets 110 can rotate around rods 108 and can be removably fixed in one of a plurality of angular positions about the rods, as will be described below. According to one embodiment of the disclosure, brackets 110 are "L" shaped with one side of the L having a hole through which rod 108 extends. On the other side of the L, a threaded hole is provided and a thumb bolt 112 is engaged with the threaded hole. Other shapes of bracket may be used, depending on the configuration of mold sections to be held by the handle clamp.

The embodiment shown in FIG. 1a has brackets 110 disposed on the two posts 108 nearest the 90 degree bend in arms 106. According to other embodiments, to accommodate molds of different configurations, brackets 110 are disposed on only one of these posts or on any combination of two or more posts 108. Also, greater or fewer number of posts than the four shown in FIG. 1a may be used to accommodate different configurations of molds.

Figure 1B:
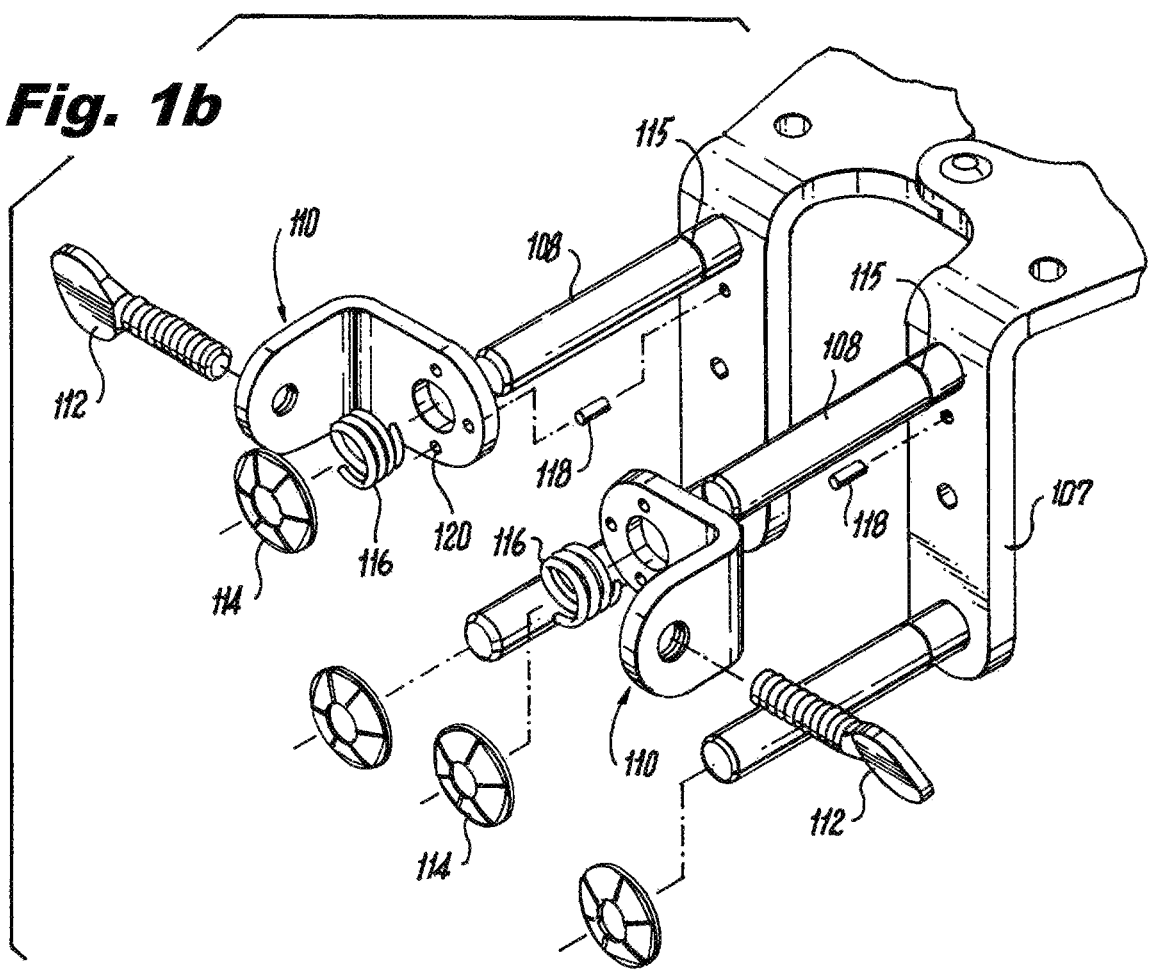

FIG. 1b shows an exploded view of handle 100. Rods 108 fit through holes in one side of brackets 110. Coil springs 116 fit over rods 108 and rest against the surface of brackets 110. Retaining rings 114 fit over rods 108 above the springs 116 and engage with notches 115 that extend around the circumference of the rods 108. The distance between the notch 115 where the ring 114 is engaged and surface of leg 107 is selected so that the spring 116 is compressed between the retaining ring 114 and the surface of bracket 110. Force exerted by the compressed spring 116 presses the bracket 110 toward the surface of the leg 107. Pegs 118 are disposed in holes in legs 107 near rods 108.

Pegs 118 are positioned to engage with one of a plurality of holes 120 on brackets 110. The force of spring 116 presses bracket 110 toward surface of leg 107, keeping peg 118 engaged with a selected one of the holes 120. This engagement locks bracket 110 into a selected angular orientation about rod 108. To change the angular orientation of a bracket, the bracket 110 is rotated about the rod 108 so that the edge of hole 120 rides up the side of peg 118, compressing spring 116 and disengaging hole 120 from peg 118. A sloped surface (not shown) at the edge of holes 120 or on peg 118 may be provided to facilitate disengagement of the peg and hole. When bracket 110 is rotated so that another hole 120 is aligned with peg 118, peg 118 engages with that other hole 120 and spring 116 presses the newly selected hole over peg 118. Instead of pegs 118, convex protrusions may be provided on the surface of legs 107 to engage with brackets 110. Also, instead of holes 120 on brackets 107, concavities such as dimples may be provided on the surface of brackets 107 facing leg 107 to engage with pegs 118 or convex protrusions on legs 107. Such concavities and/or convex protrusions can be created by stamping. Also, instead of coil springs 116 shown in FIG. 1b, spring washers may be provided between rings 114 and brackets 110.

Figure 1C:
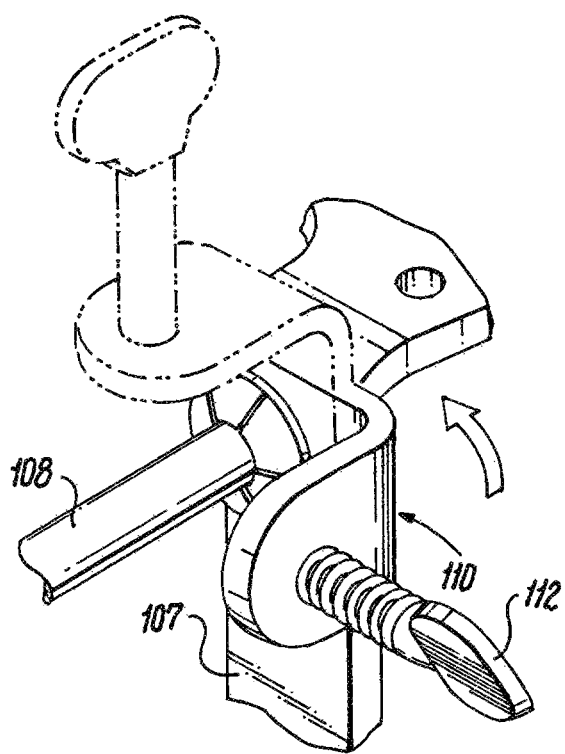
FIG. 1c is a detailed view of a portion of the embodiment of FIG. 1a showing different selected orientations of a bracket.

FIG. 1c shows bracket 110 in an orientation where thumb bolt 112 is perpendicular with leg 107. In this configuration, handle 100 is adapted to connect with a mold that separated along a vertical plane like the one shown in FIGS. 2a-4, as will be described below. According to one embodiment, when brackets 110 are rotated so that thumb bolts 112 are parallel with legs 107 and engaged, as shown in the phantom image of FIG. 1c, the handle 100 is adapted to connect with a mold that separates along a horizontal plane, like the one shown in FIGS. 5a-c, as will be described below.

Instead of springs 116 positioned between retaining rings 114 and brackets 110, other mechanisms to apply a force on the brackets 110 can be used, for example, spring washers, elastomeric washers, magnetic inserts, and the like can be used. Also, instead of pegs or convex protrusions extending from the surface of legs 107 to engage holes 120 on the bracket, the peg or convex protrusion can be located on the bracket to engage with a plurality of holes or concave features on the leg.

Figure 2A:
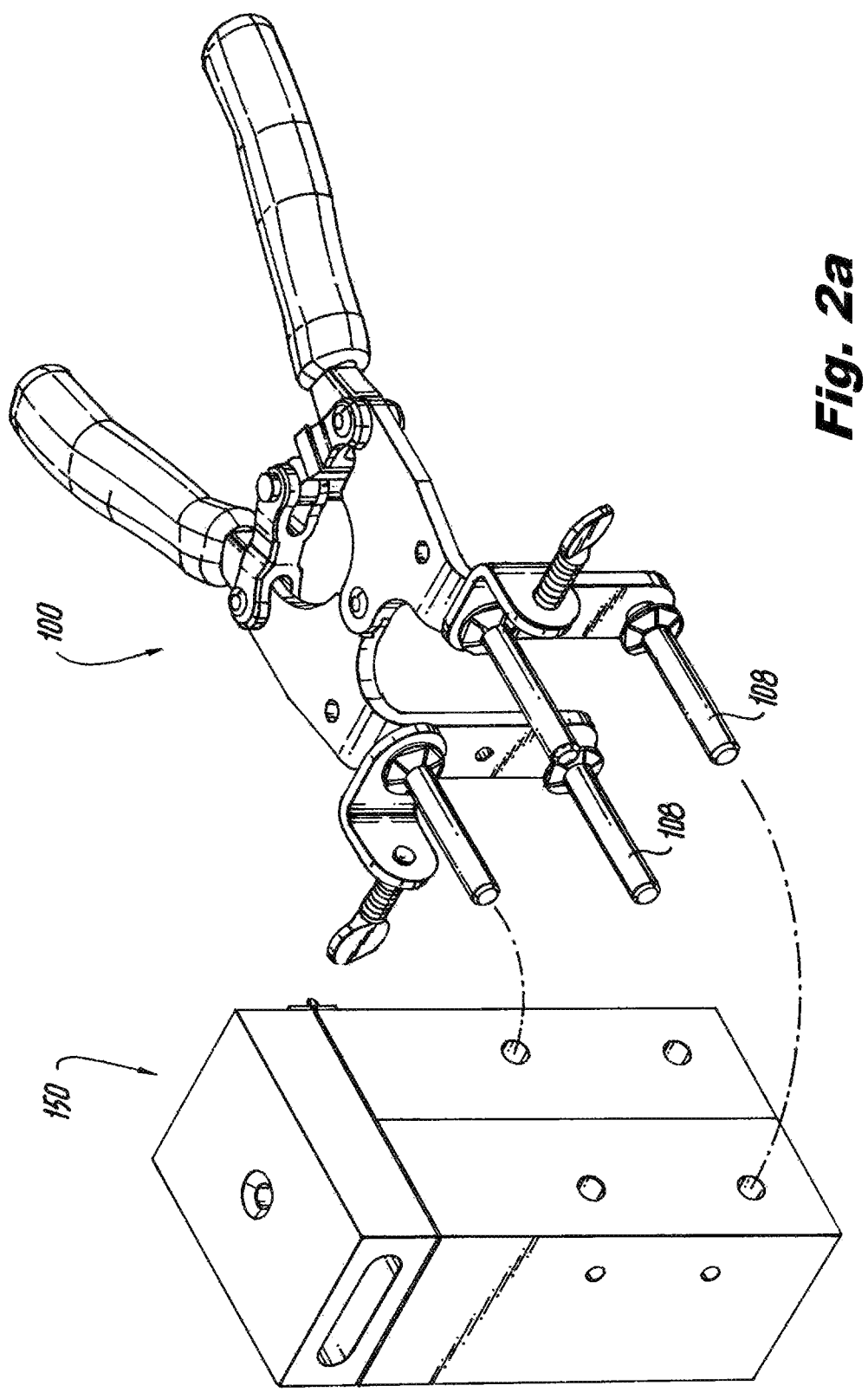
FIG. 2a is a perspective view of a handle clamp according to an embodiment of the disclosure in relation to an exothermic mold.
Figure 2B:
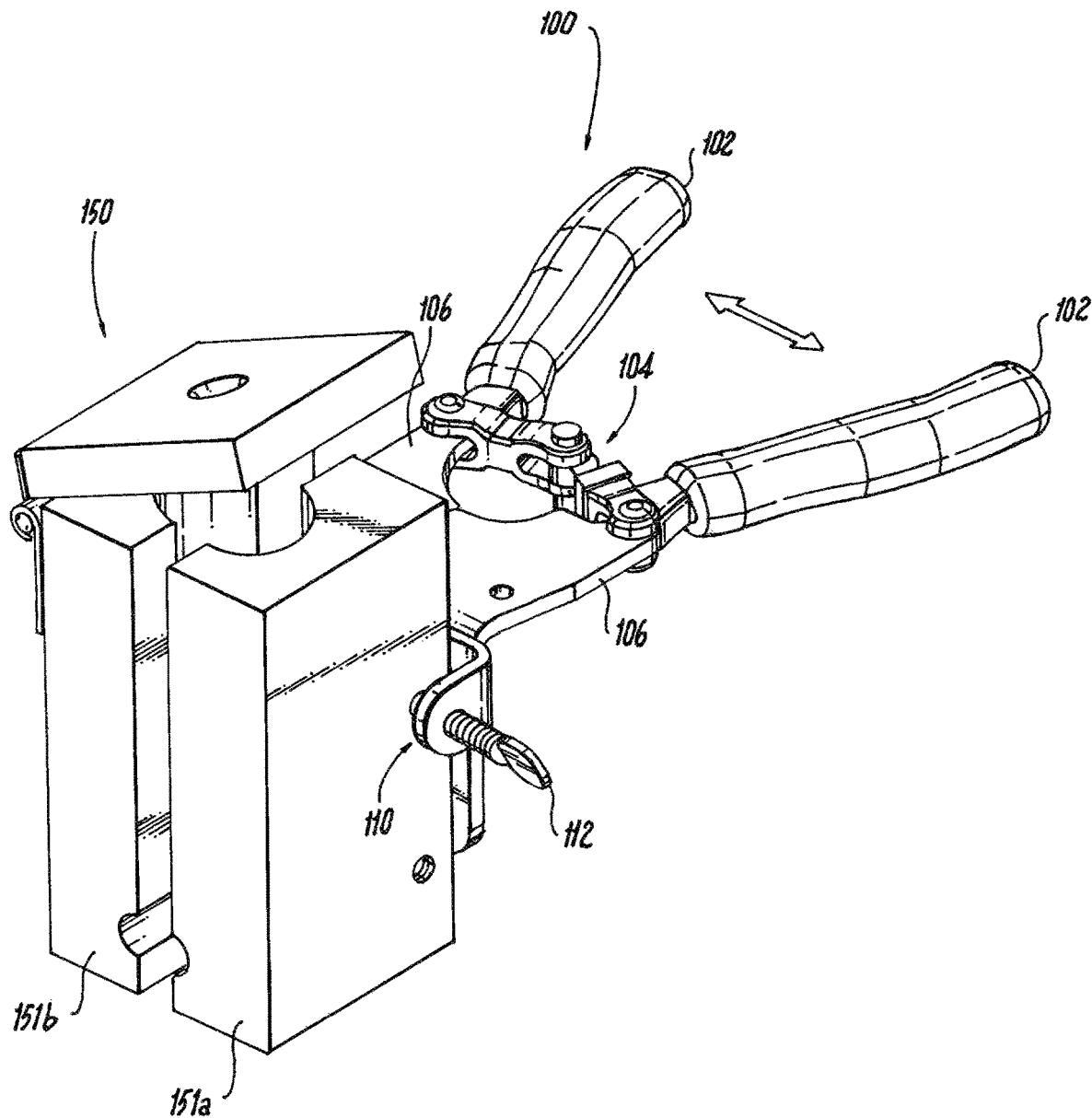
FIG. 2b shows another perspective view of the embodiment of FIG. 2a with the handle clamp connected with the mold.

FIG. 2a shows handle 100 in relation to a mold 150 with the mold closed. FIG. 2b shows handle 100 connected with the mold 150 and with the mold in the open configuration. FIGS. 3a and 3b show perspective views of the mold 150 without the handle attached. The mold is formed from two sections 151a and 151b that separate along a vertical plane. A lid 158 is joined to the top edge of one of the sections 151b by a hinge 156. The mold 150 includes engagement holes 152. The engagement holes 152 are shaped to allow rods 108 on the handle 100 to be inserted. Holes 152 are deep enough so that, when rods 108 are fully inserted, the surface of the mold contacts retaining rings 114 disposed on rods 108. Channel 160 allows one or more conductors to be positioned in the mold cavity. According to one embodiment, the mold is used to splice together the ends of two conductors. The conductors are inserted into either end of channel 160 on opposite sides of the mold so that they meet at a mold cavity 204. When a reaction mixture is ignited, as will be described below, the resulting molten metal flows into the mold cavity 204, welding the conductor ends together. The mold sections are then separated, allowing the joined conductors to be removed from the mold and the mold reused.

Stabilizer holes 154 are provided on the sides of the mold sections 151a, b adjacent to the sides including holes 152. Stabilizer holes 154 are blind holes that are sized to provide clearance for the ends of thumb bolts 112 of handle 100. According to one embodiment, stabilizer holes 154 are perpendicular to engagement holes 152. Each mold portion 151a, b fits over rods 108 on respective ones of legs 107. When rods 108 are fully inserted into holes 152 and brackets 110 are positioned with the thumb bolts 112 perpendicular to legs 107 as shown in solid lines in FIG. 1c, thumb bolts 112 are aligned with stabilizer holes 154. The mold 150 is fixed to the handle 100 by screwing the thumb bolts 112 into stabilizer holes 154 so that the ends of the thumb bolts 112 engage with holes 154. This engagement prevents the mold 100 from sliding along rods 108. Because the holes 120 on brackets 110 are engaged with pegs 118, the installer does not need to hold bracket 110 in position, while at the same time rotating the thumb bolt 112.

To form a weld, the installer installs the mold 150 on handle 100, as described above. The installer pulls apart grips 102 of the handle, pulling legs 107 holding mold sections 151a,b away from one another to open the mold cavity, as shown in FIG. 2b. The installer positions one or more conductors to be welded into channel 160 of the mold. The installer closes the mold by squeezing the grips together and engaging the locking mechanism 104 to hold the mold sections 151a,b tightly together.

Figure 4:
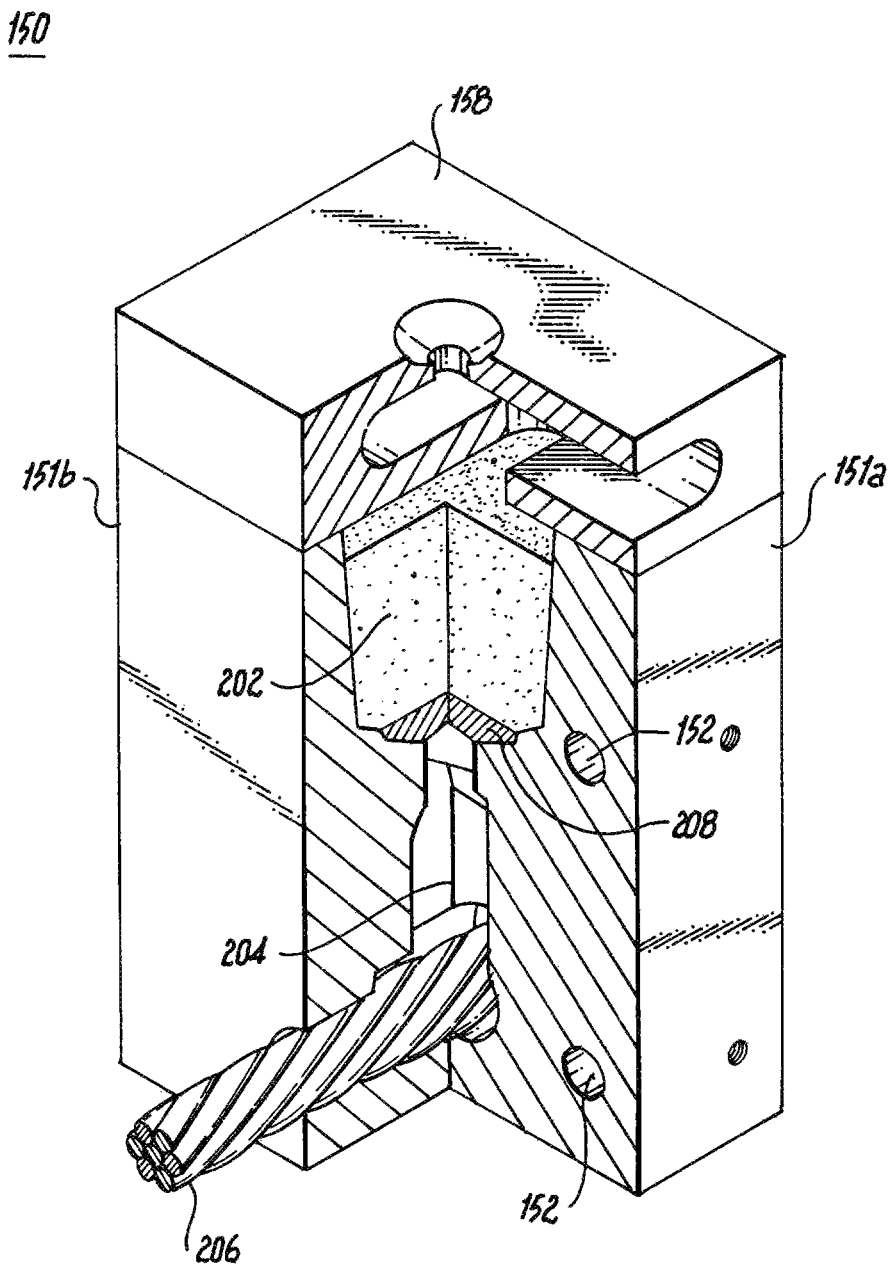

FIG. 4 shows a partial cutaway view of the mold 150 with the sections pressed together and conductors 206 positioned in channel 160. For clarity, handle 100 is not shown. Surrounding the portion of the conductors 206 where the weld will be formed is a mold cavity 204. The mold cavity 204 is shaped to form a weld with the required mechanical and electrical characteristics. Above the mold cavity 204 is a reactant cavity 202. The installer positioned a steel disc 208 at the bottom of reactant cavity 202 above mold cavity 204. The installer fills reactant cavity 202 with a charge of reactant mixture and closes lid 158. The installer pours a small amount of starter powder through a hole in lid 158. The installer ignites the starter powder that, in turn, ignites the reactant mixture. The resulting exothermic reaction creates liquid metal, for example, liquid copper, in the reactant cavity 202. When the temperature in the reactant cavity is high enough the steel disc 208 melts, allowing the liquid metal to flow into the mold cavity 204. The liquid metal wets the conductors and fills the mold cavity 204, forming a welded connection between the conductors. Once the liquid metal cools and solidifies, the installer disengages the lock 104 and pulls apart the grips 102 of handle 100, separating legs 107 and respective mold sections 151a, b. This allows the mold 150 to be removed from the welded conductors.

Figure 5A:
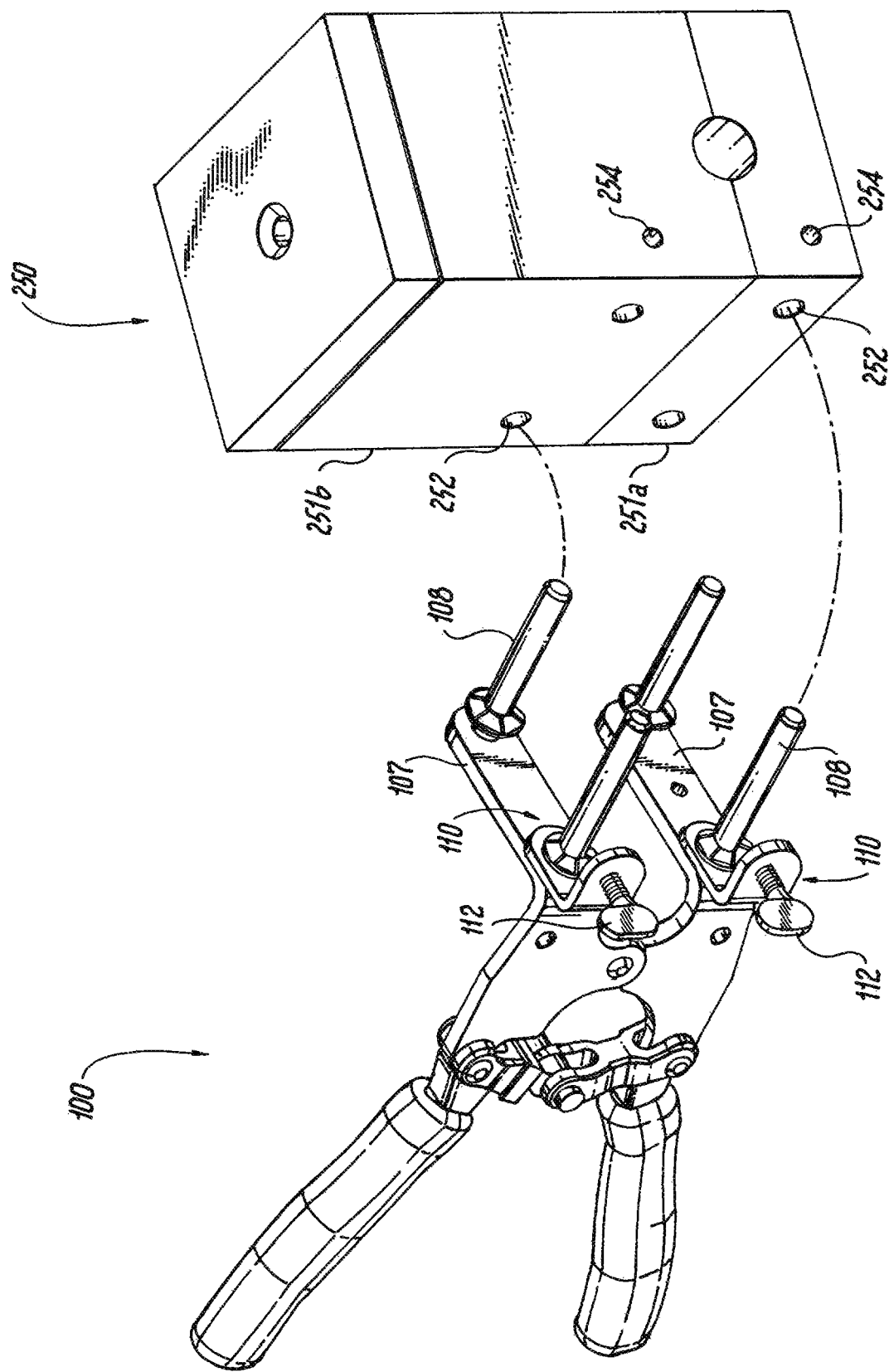
FIG. 5a shows a handle clamp according to another embodiment of the disclosure in relation to an exothermic mold.
Figure 5B:
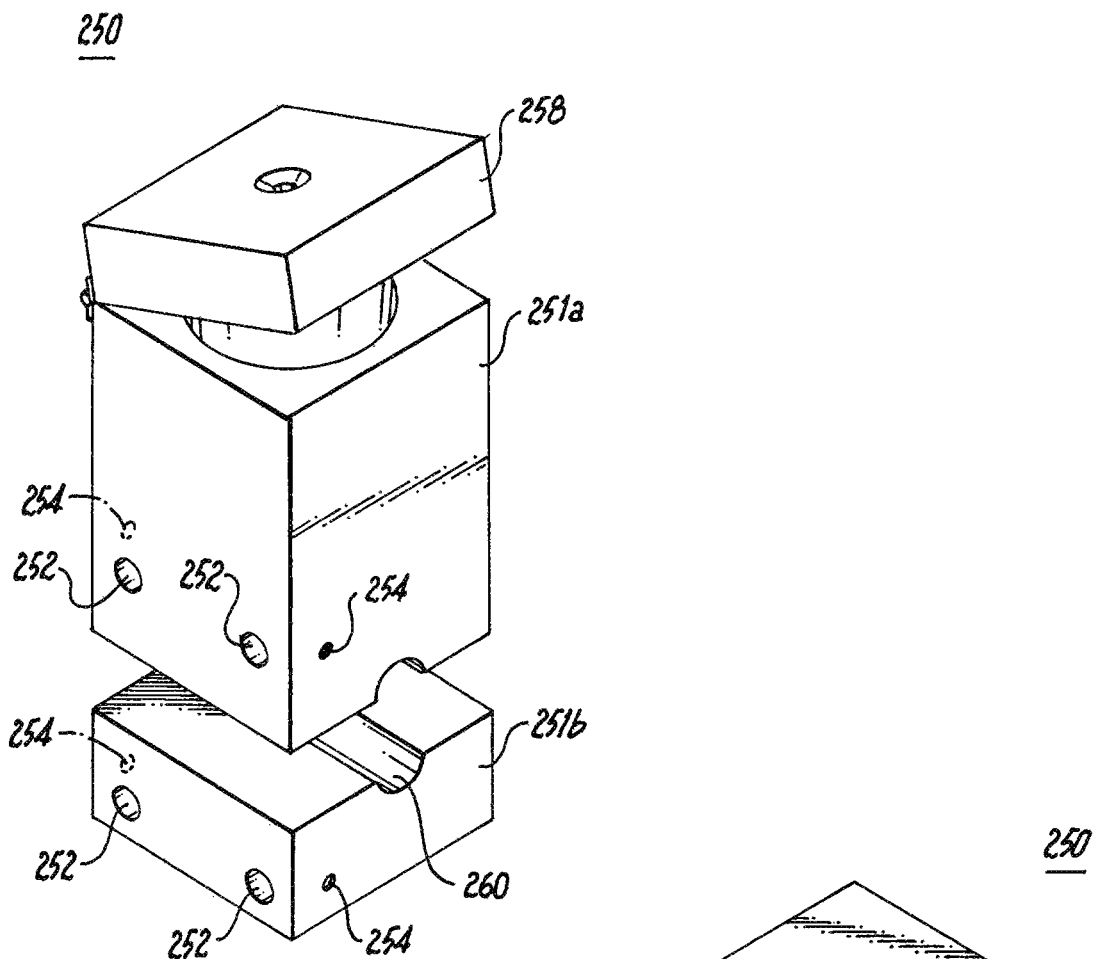

FIG. 5a shows handle 100 in relation to a different configuration of mold 250 than the one shown in FIGS. 2a-4. As shown in FIG. 5b, mold 250 is formed from two sections 251a and 251b that separate from one another along a horizontal plane. Holes 252 are shaped to receive rods 108. Stabilizer holes 254 are provide on sides of the mold to receive thumb bolts 112. As shown in FIG. 5a, handle 100 engages the mold sections 251a and 251b with the with grips 102 arranged vertically so that legs 107 are positioned horizontally. The configuration of brackets 110 is shown by the phantom lines in FIG. 1c. Rods 108 on one of the legs 107 engage the lower section of the mold 251a and rods of the other leg 107 engage the upper section 251b.

Figure 5C:
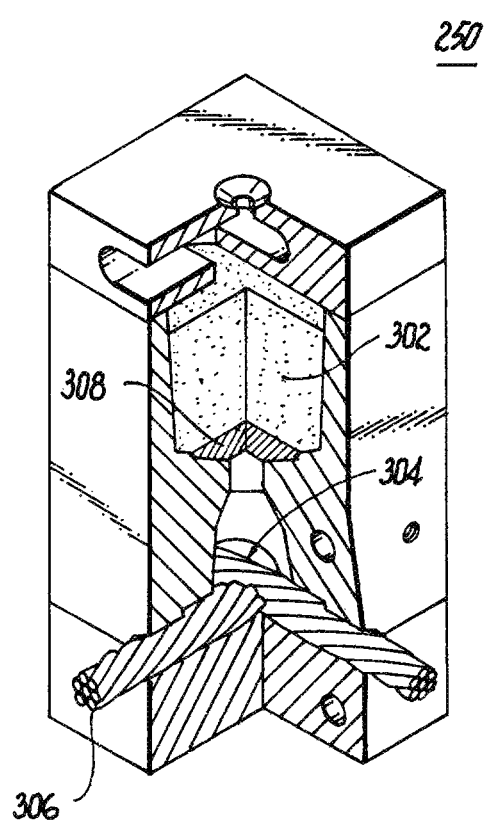

To connect mold 250 with handle 100, brackets 110 are turned so that thumb bolts 112 are pointed parallel to legs 107 (as shown in the phantom image of FIG. 1c). A different selected hole 120 on the bracket engages with pin 118 to hold the bracket in place than the one in the configuration described with respect to mold 150 in FIGS. 2a-4. In this configuration, when rods 108 are inserted into holes 252, brackets 110 extend along the sides of the mold sections 251a and 251b. The installer tightens bolts 112 to engage with stabilizer holes 254. Because this mold opens along a horizontal plane, it can accommodate different configurations of conductors. For example, as shown in FIG. 5c, a "T" shaped configuration of welded conductors can be formed using this type of mold.

In a similar manner as described with regard to FIG. 4, conductors 306 are positioned so that the portions to be welded together are held in mold cavity 304. The grips 102 of the handle 100 are squeezed together and the locking mechanism 104 is engaged, forcing the mold sections 251a, b together. A reactant mixture is placed in reactant chamber 302. The reactant mixture is ignited, causing a chemical reaction that generates molten metal and melts steel disc 308. The molten metal flows into mold cavity 304, forming the welded joint. The grips 102 of the handle 100 are pulled apart, separating the mold sections and allowing the mold to be removed from the finished weld and reused.

Figure 6A:
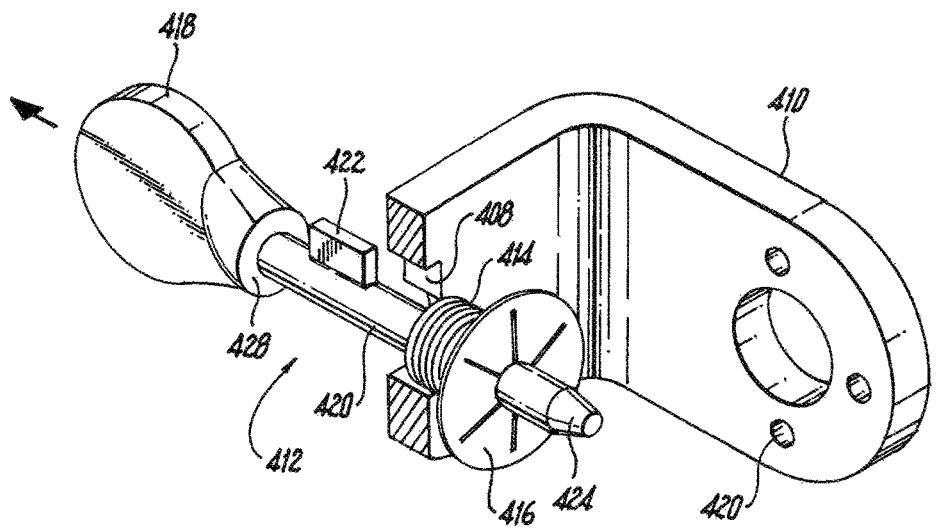
FIG. 6a shows a perspective and partial cut away view of a bracket and spring-driven bolt according to another embodiment of the disclosure.
Figure 6B:
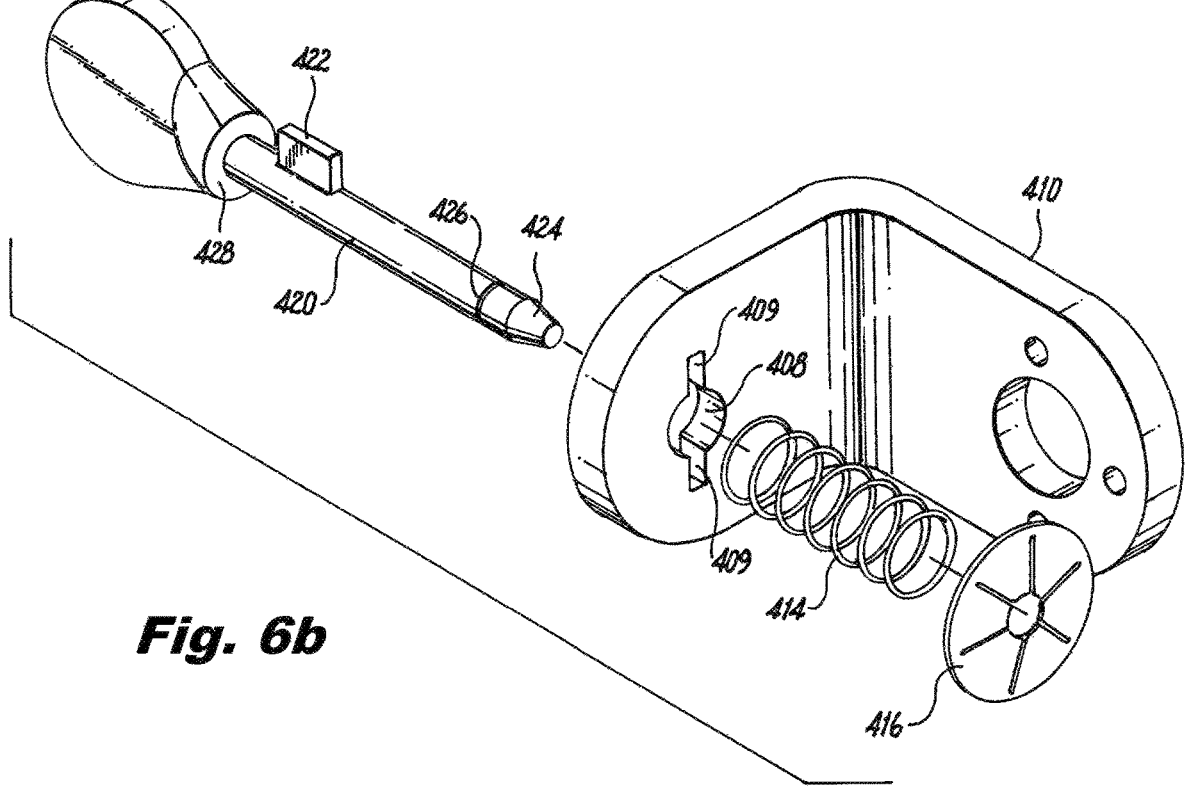

Instead of using threaded thumb bolts 112 to engage stabilizer holes 154, 254, retractable spring-driven bolts may be provided. FIG. 6a shows a perspective and partial cut away view of bracket 410 and spring-driven bolt 412 according to a further embodiment of the disclosure. FIG. 6b shows an exploded view of the bracket 410 and spring-driven bolt 412. Spring-driven bolts 412 replace one or more of bolts 112 of the previous embodiments. Spring-driven bolts can be used with or without the angular positioning mechanism formed by holes 120 and pegs 118 described above with regard to brackets 110.

As shown in FIGS. 6a and 6b, one portion of bracket 410 includes a hole sized to fit onto rod 108 of handle 100 as well as holes 420 that engage with pins 118 of extending from the legs 107 of handle 100 in the same manner as bracket 110 as described with respect to previous embodiments. This arrangement allows bracket 410 to be removably positioned in an angular orientation suitable for fitting the handle onto a selected mold section as discussed above.

Bracket 410 includes key hole 408. Key hole 408 has a round opening and one or more keying slots 409. Spring bolt 412 includes shaft 420 with a round cross section that is sized to fit through the round portion of key hole 408 and one or more keys or protrusions 422 extending radially from the shaft. When keys 422 are aligned with slots 409, the keys fit through the slots. Thumb pull 418 is provided at a proximal end of bolt 412. Thumb pull 418 includes bearing surface 428. At the distal end of shaft 420 is a mold engaging tip 424. Located near the distal end of shaft 420 is a groove 426 shaped to engage with retaining ring 416.

When assembled, shaft 420 extends through hole 408. Spring 414 is disposed around shaft 420. Retaining ring 416 is fitted over the distal end of shaft 420 and engages with groove 426. Spring 414 is compressed between the distal surface of bracket 410 and retaining ring 416 so that bolt 412 is biased in the distal direction toward the surface of a mold section installed on the handle clamp. Instead of a retaining ring 416 engaged with a groove 426 to engage spring 414, bolt 412 could be machined or forged to provide a spring-engaging flange or threads could be provided and a spring-retaining nut could be threaded onto the bolt.

Figure 7A:
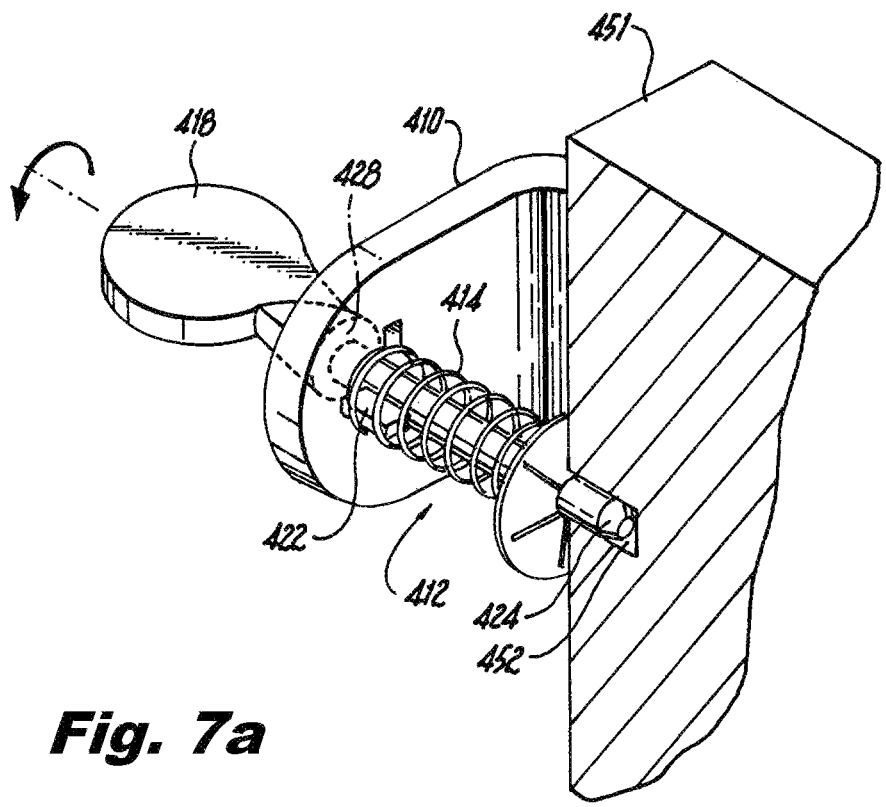
FIG. 7a is a perspective view of the embodiment of FIG. 6a with the spring-driven bolt engaged with a section of an exothermic mold.

FIG. 7a shows a partial cross section of bracket 410 and spring-driven bolt 412 engaging mold section 451. As described with respect to previous embodiments, engagement of bolt 412 with stabilizer hole 452 on the side of the mold section 451 prevents mold section 451 from sliding along rod 108. When tip 424 is engaged with stabilizer hole 452, the installer rotates bolt 412 so that the proximal end of key 422 is turned away from slot 409. The length of key 422 along bolt 412 is selected so that the proximal end of key 422 contacts the distal surface of bracket 410 preventing bolt 412 from moving in the proximal direction and securing the handle to the mold section.

According to another embodiment, bracket engaging surface 428 on bolt 412 contacts the proximal surface of bracket 410 when tip 424 is inserted into hole 452. According to another embodiment, tip 424 contacts a bottom of hole 452 and is held against the bottom of the hole by the biasing force exerted by spring 414. According to these embodiments the length of key 422 can be selected to allow the installer to pull the bolt in the proximal direction far enough to disengage the tip 424 from the stabilizer hole 452 without having to align the key 422 with slot 409.

Figure 7B:
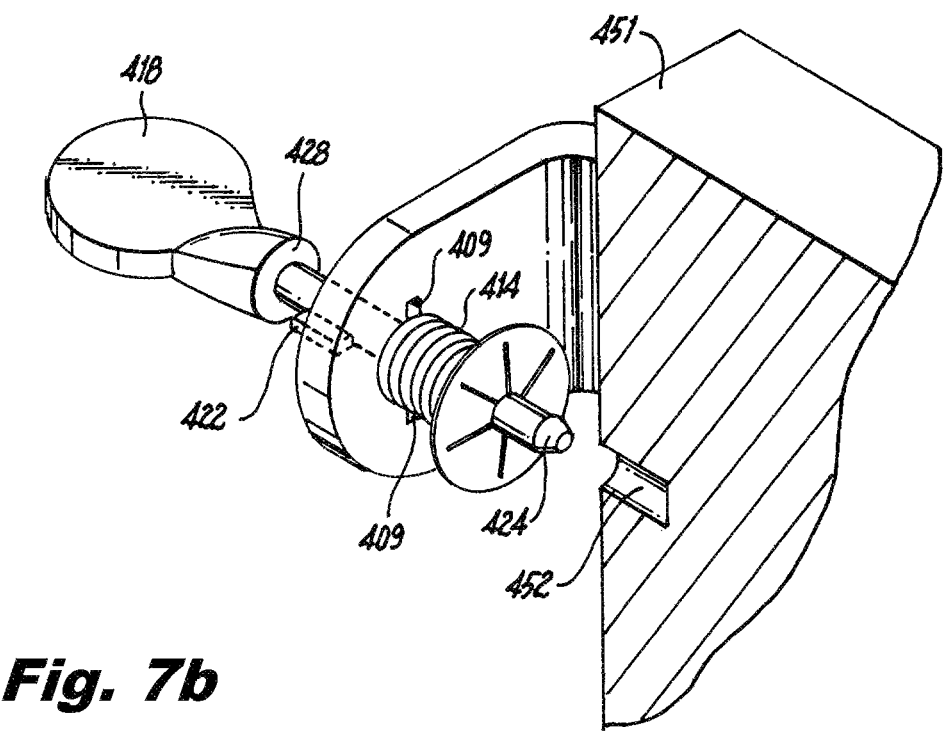
FIG. 7b is a perspective view of the embodiment of FIG. 6a with the spring-driven bolt disengaged from the section of the exothermic mold.

FIG. 7b shows spring bolt 412 disengaged from mold section 451. To move the bolt 412 from the engaged configuration in FIG. 7a to the disengaged configuration of FIG. 7b the installer turns bolt 412 so that key 422 is aligned with key slot 409. The installer pulls the bolt 412 in the proximal direction, compressing spring 414 against the distal side of bracket 410. Once key 422 is pulled through slot 409, the installer turns bolt 412 so that the key is not aligned with the slot. The installer releases bolt 412. The bias applied by spring 414 moves the bolt distally so that the distal end of the key 422 rests against the proximal side of bracket 410 as is shown in FIG. 7b. Mold section 451 can now be pulled away from the handle 100 along rod 108 with bolt 412 held out of the way.

Figure 8A:
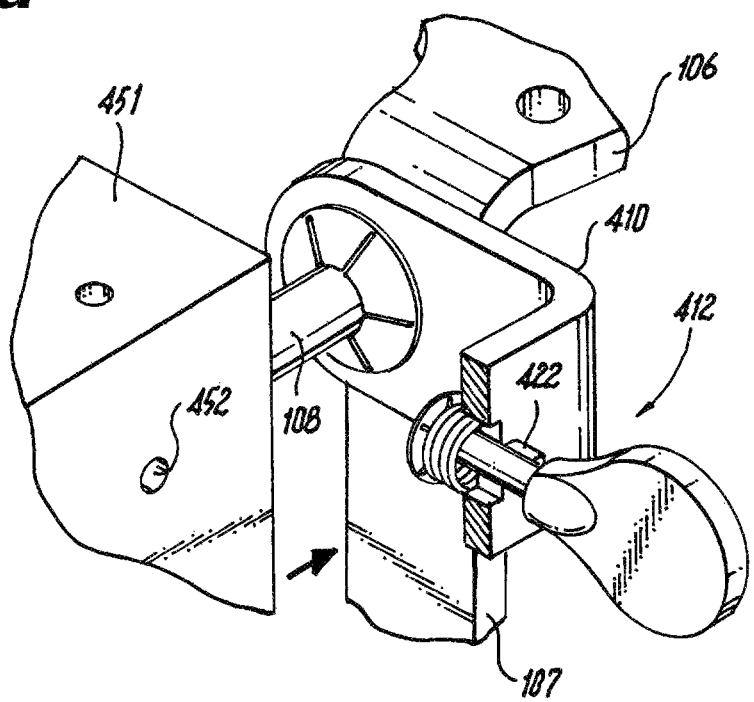
FIGS. 8a and 8b are perspective views of a bracket and spring-driven bolt according to another embodiment of the disclosure.
Figure 8B:
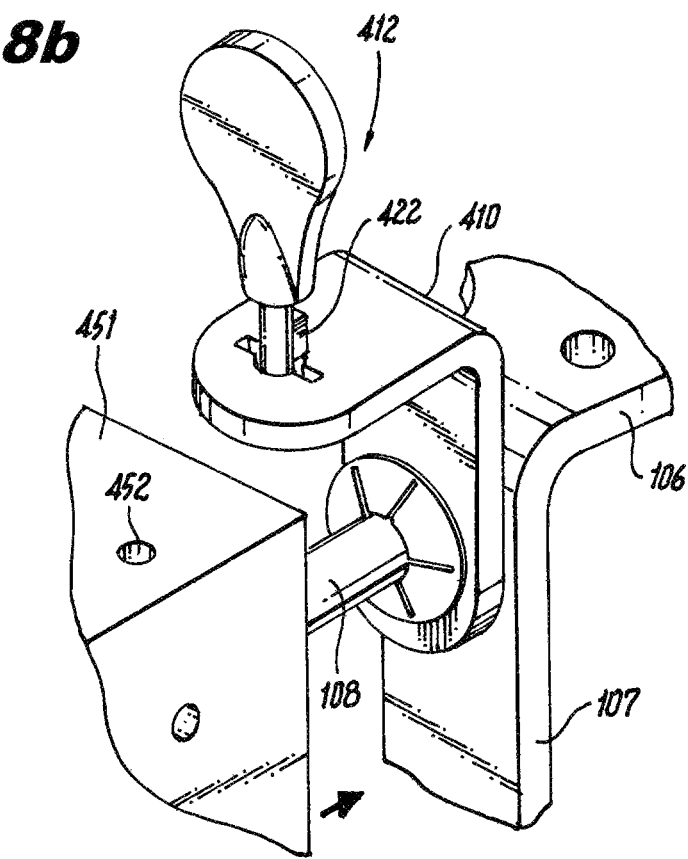

To install a new mold section onto the handle, the installer puts bolt 412 in the disengaged position shown in FIG. 7b and configures the angular positions of brackets 410 about rods 108 to accommodate the configuration of the newly selected mold. Pins 118 engage with appropriate holes 420, as described with respect to FIG. 2a or 5a. FIGS. 8a and 8b show bracket 410 positioned either parallel or perpendicular with leg 107. Because bolts 412 are held in the disengaged configuration, the bolts will not interfere with the insertion of rods 108 into a new mold section. Also, because brackets 410 are fixed in a parallel or perpendicular configuration with respect to legs 107 of handle 100 by the engagement of pins 118 with holes 420, the installer does not need to hold brackets 410 in place while the new mold section is fitted over rods 108. For embodiments where the angular engagement mechanism formed by holes 420 and pegs 118 is not used, the installer holds brackets 410 at the proper orientation while installing the mold section onto rods 108.

Once rods 108 are fully inserted into mold section 451, the installer turns bolt 412 so that key 422 aligns with slots 409 of key hole 408. Bias applied by spring 414 moves bolt 412 distally toward mold section 451 so that tip 424 engages with stabilizer hole 452 of the new mold section. This fixes mold section onto rod 108. The installer can then fit conductors into the mold cavity and create the exothermic weld as described with respect to previous embodiments.

According to another embodiment, the spring is arranged to bias the bolt in a direction away from the mold surface. Instead of being compressed between a distal surface of the bracket and a retaining ring, the spring is affixed to the surface of the bracket and the retaining ring and is extended under tension when the tip of the bolt is engaged with the stabilizer hole of the mold. In this embodiment the bolt is held in a disengaged position by the biasing force of the spring. To install a mold section, the installer aligns the key with the key slot and pushes the bolt toward the mold section, extending the spring. When the tip of the bolt engages the stabilizer hole, the installer turns the bolt so that the key is not aligned with the key slot. The proximal end of the key rests against the distal surface of the bracket. The length of the key is selected so that the tip of the bolt remains engaged with the stabilizer hole. To remove the mold section, the installer rotates the bolt until the key aligns with the key slot, allowing the bolt to retract away from the mold section under the biasing force of the spring.

Figure 9:
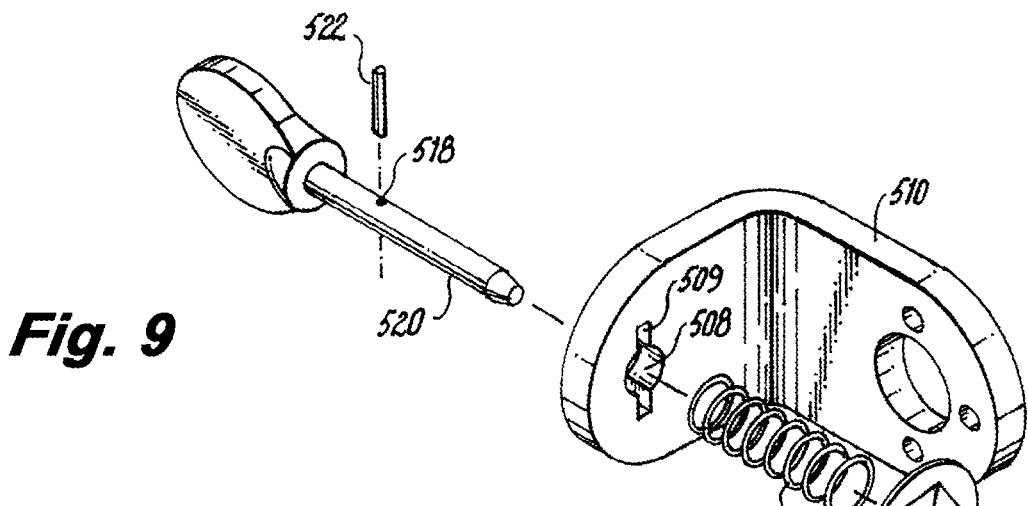
FIG. 9 shows an exploded view of a spring-driven bolt and bracket according to another embodiment of the disclosure.

FIG. 9 shows an exploded view of alternative embodiment of a spring-driven bolt 512 and bracket 510. As with the embodiment described with respect to FIGS. 6a and 6b, bolt 512 fits through a key hole 508 of bracket 510. Bolt 512 has a hole 518 through shaft 520. Pin 522 is inserted into hole 518 and fixed, for example, by welding. The ends of pin 522 extend from shaft 520 to form key protrusions, as discussed in previous embodiments. Bolt 512 is inserted into hole 508 of bracket 510. Spring 514 is fitted over shaft 520 on the distal side of bracket 510. Retaining ring 516 is fitted over the end of bolt 512 and engages with spring 514 to provide a biasing force urging bolt 512 in the distal direction.

Figure 10:
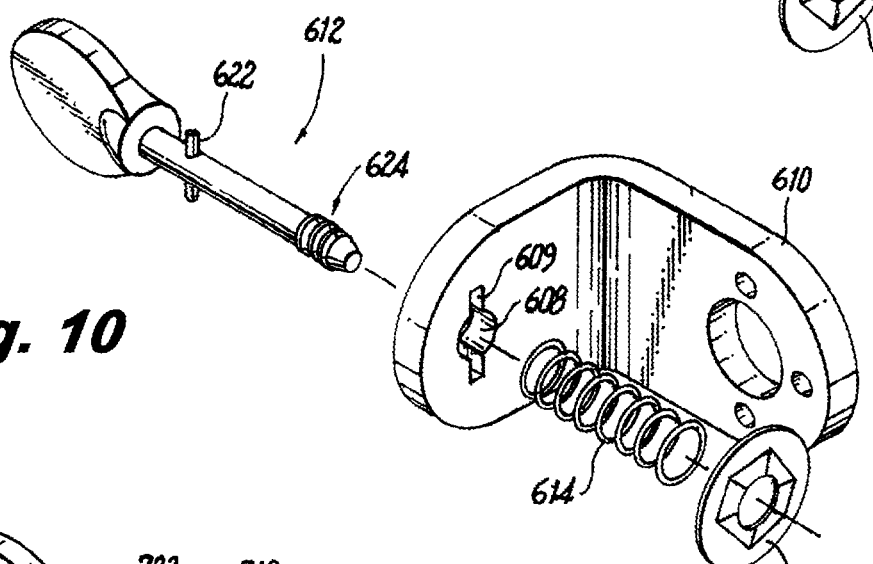
FIG. 10 shows an exploded view of a spring-driven bolt and bracket according to another embodiment of the disclosure.

FIG. 10 shows a spring-driven bolt 612 and bracket 610 according to a further embodiment of the disclosure. Bolt 612 includes a threaded portion 624 at its distal end. The threads are configured to engage with internal threading of a stabilizer hole of a mold section such as hole 154 of mold section 151a, as shown in FIG. 3a. According to this embodiment, to engage a mold section with handle 100, the installer rotates bolt 612 until protrusions 622 align with slots 609. As with the previous embodiments, spring 614 biases bolt 612 in the distal direction and into contact with a threaded stabilizer hole of a mold section. The installer rotates bolt 612 so that threaded portion 624 threads into the stabilizer hole, thus securing the mold section to the handle 100. To remove the mold section from the handle, the installer unscrews bolt 612 from the hole, aligns protrusions 622 with slots 609, pulls the bolt 612 proximally so that protrusions 622 pass through the slots 609 to the proximal side of bracket 610, and rotates the bolt again so that the protrusions can rest against the proximal surface of the bracket under the biasing force of the spring.

Figure 11:
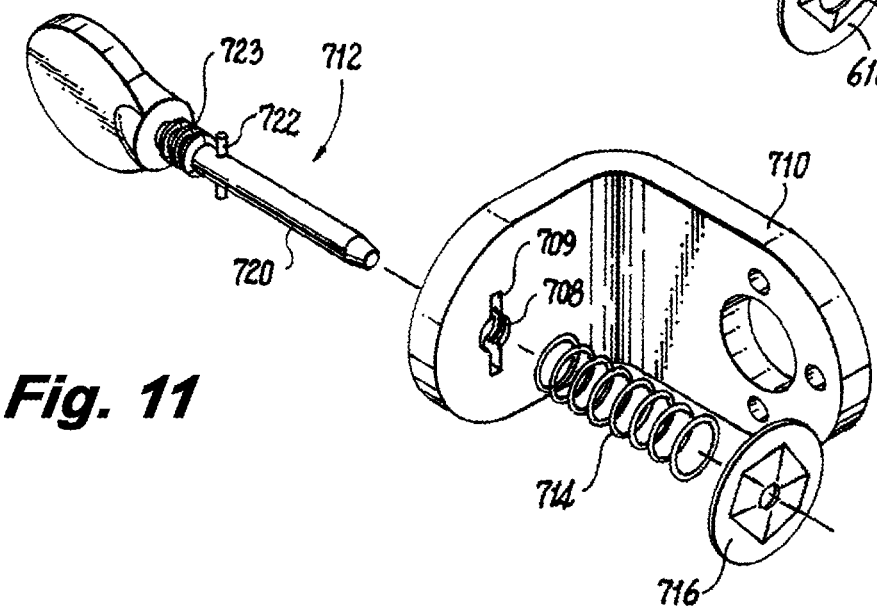
FIG. 11 shows an exploded view of a spring-driven bolt and bracket according to another embodiment of the disclosure.

Alternatively, instead of providing threads at the distal tip of the bolt, threads 723 may be provided on the shaft 720 of the bolt 712 proximal of the protrusions 722 as shown in FIG. 11. Hole 708 of the bracket 710 is threaded to engage with threads 723 on bolt 712. As with previous embodiments, spring 714 is provided around shaft 720 and is captive between retaining ring 716 and distal surface of bracket 710. The spring provides a biasing force urging bolt 712 in the distal direction. To affix a mold section to the handle, the installer positions bolt 712 so that the protrusions 722 are held against the proximal side of the bracket 710 by the biasing force of spring 714, thus stability holding the bolt out of the way so that rods 108 may be inserted into the mold section. The installer rotates bolt 712 so that protrusions 722 pass through slots 709 and bolt 712 moves toward the mold section under the bias force of spring 714. The distal end of threaded portion 723 of shaft 720 contacts the proximal side of threaded hole 708. The installer rotates bolt 712 so that the threads engage, thus securing the bolt into engagement with the mold section.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

We claim:

1. A handle clamp for an exothermic mold comprising: a pair of grips; a pair of legs, each leg in said pair of legs connected with a respective grip of the pair of grips, the legs arranged to move toward and away from one another in response to motion of the grips; a plurality of engagement rods disposed on each of the legs, wherein the engagement rods on each said leg are adapted to engage with respective sections of the exothermic mold; one or more brackets, each said bracket rotatably disposed on one of the engagement rods, wherein each said bracket comprises a bolt hole through the bracket; one or more bolts, each said bolt disposed in the bolt hole of a respective bracket and movable toward and away from a surface of the mold, wherein each said bolt comprises a shaft, a pin hole in the shaft, and a pin fitted into the pin hole; and a detent mechanism to releasably hold each said bracket in one of a plurality of angular positions with respect to a respective one of the engagement rods.

2. The handle clamp of claim 1, wherein the detent mechanism comprises a convex feature and a plurality of concave features arranged radially about the respective engagement rod, the convex feature disposed on a first leg of the pair of legs or the one or more brackets and the concave features disposed on a second leg of the pair of legs or the one or more brackets, the concave and convex features shaped to engage with one another and positioned so that when a selected one of the concave features is engaged with the convex feature, the one or more brackets is positioned in a respective one of the plurality of angular positions about the respective rod.

3. The handle clamp of claim 2, wherein the detent mechanism further comprises a force applying member adapted to apply a force to hold the engaged said convex and concave features against one another.

4. The handle clamp of claim 3, wherein the force applying member is one of a coil spring, a spring washer, an elastomeric washer, and a magnetic insert.

5. The handle clamp of claim 2, wherein the concave feature is a hole or dimple on the leg or the one or more brackets.

6. The handle clamp of claim 2, wherein the convex feature is a peg extending from one of the first or second legs or the one or more brackets and the plurality of concave features is a hole in the other of the first or second legs or the one or more brackets.

7. The handle clamp of claim 1 further comprising a locking mechanism, the locking mechanism releasably locking the grips in a closed position.

8. The handle clamp of claim 1, wherein the bolt and the bolt hole are in threaded engagement with one another.

9. The handle clamp of claim 8, wherein the bolt hole further comprises a key slot, wherein the pin extends from the shaft, wherein the bolt is rotatable in the hole, and wherein, when the pin is aligned with the key slot, the bolt can slide through the bolt hole.

10. The handle clamp of claim 9, wherein the pin engages a distal surface of the bracket when a tip of the bolt engages with the mold section.

11. The handle clamp of claim 1, wherein the bolt comprises a bolt-driving spring arranged to bias the bolt in a direction toward or away from the mold.

12. The handle clamp of claim 11, wherein the bolt-driving spring comprises a coil spring, wherein the bolt further comprises a spring retaining feature, and wherein the coil spring is disposed between a surface of the bracket and the spring retaining feature.

13. The handle clamp of claim 1, wherein the bolt further comprises a threaded portion adapted for threaded engagement with a threaded hole of the mold section.

14. The handle clamp of claim 1, wherein the bolt hole further comprises an inner threaded portion, wherein the bolt further comprises an outer threaded portion, and wherein rotation of the bolt in the bolt hole engages the outer threaded portion with the inner threaded portion.

15. A handle clamp for an exothermic mold comprising: a pair of grips; a pair of legs, each leg in said pair of legs connected with a respective grip of the pair of grips, the legs arranged to move toward and away from one another in response to motion of the grips; a plurality of engagement rods disposed on each of the legs, wherein the engagement rods on each said leg are adapted to engage with respective sections of the exothermic mold; a bracket rotatably disposed on at least one of the engagement rods, wherein the bracket comprises a bolt hole through the bracket and the handle clamp further comprising a bolt, said bolt disposed in the bolt hole and movable toward and away from a surface of the mold, wherein the bolt comprises a shaft, a pin hole in the shaft, and a pin fitted into the pin hole; and a detent mechanism to releasably hold the bracket in one of a plurality of angular positions of the bracket with respect to the at least one engagement rod, wherein the detent mechanism includes a force applying member configured to bias the bracket towards a leg of the pair of legs.

16. The handle clamp of claim 15, wherein the bolt hole further comprises a key slot, wherein the pin extends from the shaft, wherein the bolt is rotatable in the hole, and wherein, when the pin is aligned with the key slot, the bolt can slide through the bolt hole.

17. The handle clamp of claim 16, wherein the pin engages a distal surface of the bracket when a tip of the bolt engages with the mold section.

18. The handle clamp of claim 15, wherein the bolt further comprises a threaded portion adapted for threaded engagement with a threaded hole of the mold section.

19. The handle clamp of claim 18, wherein, the bolt hole further comprises an inner threaded portion, wherein the bolt further comprises an outer threaded portion, and wherein rotation of the bolt in the bolt hole engages the outer threaded portion with the inner threaded portion.

\* \* \* \* \*